United States Patent
Choi et al.

(10) Patent No.: US 8,970,627 B2
(45) Date of Patent: Mar. 3, 2015

(54) METHOD AND APPARATUS FOR SETTING NAVIGATION SCREEN UPDATE CYCLE IN A MOBILE TERMINAL

(75) Inventors: Jun-Yong Choi, Suwon-si (KR); Il-Hwan Kim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 642 days.

(21) Appl. No.: 12/881,553

(22) Filed: Sep. 14, 2010

(65) Prior Publication Data
US 2011/0063329 A1    Mar. 17, 2011

(30) Foreign Application Priority Data
Sep. 14, 2009  (KR) .................. 10-2009-0086424

(51) Int. Cl.
*G09G 5/00* (2006.01)
*G01S 19/52* (2010.01)
*G09G 5/395* (2006.01)

(52) U.S. Cl.
CPC .......... *G01S 19/52* (2013.01); *G09G 5/003* (2013.01); *G09G 5/395* (2013.01); *G09G 2340/0435* (2013.01); *G09G 2370/16* (2013.01)
USPC .................................... 345/643; 345/418

(58) Field of Classification Search
USPC ................................. 342/357.31; 701/457, 212
See application file for complete search history.

(56) References Cited

U.S. PATENT DOCUMENTS

| | | | | |
|---|---|---|---|---|
| 4,635,202 A | * | 1/1987 | Tsujii et al. | 701/457 |
| 5,777,875 A | * | 7/1998 | Miyano | 700/83 |
| 2001/0020211 A1 | * | 9/2001 | Takayama et al. | 701/200 |
| 2009/0273513 A1 | * | 11/2009 | Huang | 342/357.12 |
| 2010/0138154 A1 | * | 6/2010 | Kon et al. | 701/212 |

* cited by examiner

*Primary Examiner* — Phi Hoang
(74) *Attorney, Agent, or Firm* — Jefferson IP Law, LLP

(57) ABSTRACT

A method and an apparatus for setting a navigation screen update cycle in a mobile terminal are provided. In the method, at least one of a velocity of the mobile terminal and a map scale used by the mobile terminal is obtained. A screen update cycle is set with consideration of the at least one of the velocity and the map scale. A navigation screen display is updated according to the set screen update cycle.

18 Claims, 3 Drawing Sheets

METHOD AND APPARATUS FOR SETTING NAVIGATION SCREEN UPDATE CYCLE IN A MOBILE TERMINAL

PRIORITY

This application claims the benefit under 35 U.S.C. §119(a) of a Korean patent application filed in the Korean Intellectual Property Office on Sep. 14, 2009 and assigned Serial No. 10-2009-0086424, the entire disclosure of which is hereby incorporated by reference.

BACKGROUND OF THE INVENTION

1. Field of the Invention

The present invention relates to a method and an apparatus for setting a navigation screen update cycle in a mobile terminal. More particularly, the present invention relates to a method and an apparatus for setting a navigation screen update cycle with consideration of a velocity of a terminal and a map scale.

2. Description of the Related Art

Recently, a mobile terminal that includes a navigation system for informing a user of a current position and guiding the user to a desired destination has increased in popularity.

Generally, when a navigation application is executed, the mobile terminal displays a map showing a current position and a traveled path on a screen and updates the screen periodically based on a preset update cycle to show the user's current position and traveled path. However, when the mobile terminal updates the screen after every update cycle, power is consumed unnecessarily. For example, in the case where a user's velocity is very slow, the mobile terminal updates the screen display after every update cycle, which consumes power despite the contents being displayed on the screen having not changed. That is, since the mobile terminal periodically updates the screen display, power is consumed compared with the case where the same screen is displayed for a preset time. Actually, in the case where a mobile terminal executes a navigation application, an amount of time the battery can be used is shorter than an amount of time the battery can be used while a different application is executed.

SUMMARY OF THE INVENTION

An aspect of the present invention is to address at least the above-mentioned problems and/or disadvantages and to provide at least the advantages described below. Accordingly, an aspect of the present invention is to provide a method and an apparatus for setting a navigation screen update cycle in a mobile terminal.

Another aspect of the present invention is to provide a method and an apparatus for setting a navigation screen update cycle in consideration of a velocity of a mobile terminal and a map scale used by the mobile terminal.

In accordance with an aspect of the present invention, a method for setting a navigation screen update cycle in a mobile terminal is provided. The method includes obtaining at least one of a velocity of the mobile terminal and a map scale used by the mobile terminal, setting a screen update cycle with consideration of the at least one of the velocity and the map scale, and updating a navigation screen display according to the set screen update cycle.

In accordance with another aspect of the present invention, an apparatus for setting a navigation screen update cycle in a mobile terminal is provided. The apparatus includes a controller for obtaining at least one of a velocity of the mobile terminal and a map scale used by the mobile terminal, and setting a screen update cycle with consideration of the at least one of the velocity and the map scale, and a display unit for updating a navigation screen display according to the set screen update cycle.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method and an apparatus for setting a navigation screen update cycle in consideration of a velocity of a mobile terminal and a map scale used by the mobile terminal.

Figure 1:
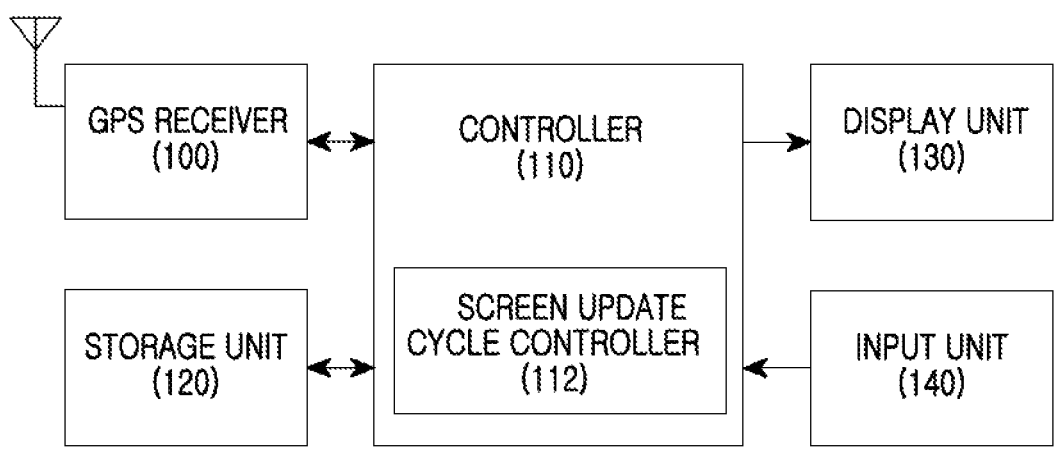
FIG. 1 is a block diagram illustrating a mobile terminal according to an exemplary embodiment of the present invention.

FIG. 1 is a block diagram illustrating a mobile terminal according to an exemplary embodiment of the present invention.

Referring to FIG. 1, the mobile terminal includes a Global Positioning System (GPS) receiver 100, a controller 110, a storage unit 120, a display 130, and an input unit 140. The controller 110 includes a screen update cycle controller 112.

The GPS receiver 100 receives electromagnetic waves transmitted by a GPS satellite, and determines current position information of the mobile terminal through the received electromagnetic waves. In addition, the GPS receiver 100 calculates a velocity of the mobile terminal using periodically obtained position information to provide the same to the controller 110.

The controller 110 controls and processes overall operations of the mobile terminal, and includes the screen update cycle controller 112 according to an exemplary embodiment of the present invention, thereby controlling and processing a function for setting a screen update cycle in consideration of a velocity of the mobile terminal and a map scale being used during execution of a navigation application. That is, the screen update cycle controller 112 sets the screen update cycle differently depending on changes of the velocity of the mobile terminal and the map scale used by the mobile terminal. For example, the screen update cycle controller 112 sets a cycle such that the screen is updated at a fast rate when the velocity of the mobile terminal is fast, and sets the cycle such that the screen is updated at a fast rate when the map scale is large.

That is, the screen update cycle controller 112 may set the screen update cycle using Equation (1) or (2).

$$T_k(ms) = \frac{1}{V_n} \times XA_P \quad (1)$$

$$A_P = DS \times \left(\frac{1}{S}\right)^2 \times P_C$$

where $T_k$(ms) is the screen update cycle, $V_n$ is a velocity of the mobile terminal, $XA_P$ is an area of X pixels, $A_p$ is an area of one pixel, DS is a screen size of the mobile terminal, S is a map scale, and $P_C$ is the number of all pixels.

That is, the screen update cycle controller 112 may calculate a velocity of the mobile terminal and an area corresponding to a distance traveled to set the screen update cycle. At this point, the area of a preset number of pixels may be obtained from a scale of a map displayed on the screen of the mobile terminal.

$$T_k(ms) = \frac{1}{V_n} \times XW_P(\text{or } XH_P) \quad (1)$$

$$W_P(\text{or } H_P) = W_{DS}(\text{or } H_{DS}) \times \frac{1}{S} \times P_C$$

where $T_k$(ms) is the screen update cycle, $V_n$ is a velocity of the mobile terminal, $XW_p$ is a width for X pixels, $XH_p$ is a height for X pixels, $W_p$ is a width of one pixel, $H_p$ is a height of one pixel, $W_{DS}$ is a screen width of the mobile terminal, $H_{DS}$ is a screen height of the mobile terminal, S is a map scale, and $P_C$ is the number of all pixels.

That is, the screen update cycle controller 112 may calculate the velocity and the distance traveled of the mobile terminal to set the screen update cycle. At this point, a distance corresponding to a preset number of pixels may be obtained from a scale of a map displayed on the screen of the mobile terminal.

The storage unit 120 stores various programs for operation of the mobile terminal and data, and more particularly, stores various data required for setting the screen update cycle according to an exemplary embodiment of the present invention.

The display unit 130 displays status information, numbers and characters, still images and moving images occurring during an operation of the mobile terminal, and updates a screen display every screen update cycle while a navigation application is executed.

The input unit 140 includes a plurality of function keys and character keys to provide input data corresponding to a key pressed by a user or a user's touch to the controller 110. More particularly, the input unit 140 receives a key or a touch operation for changing the map scale from the user and provides the same to the controller 110.

Figure 2:
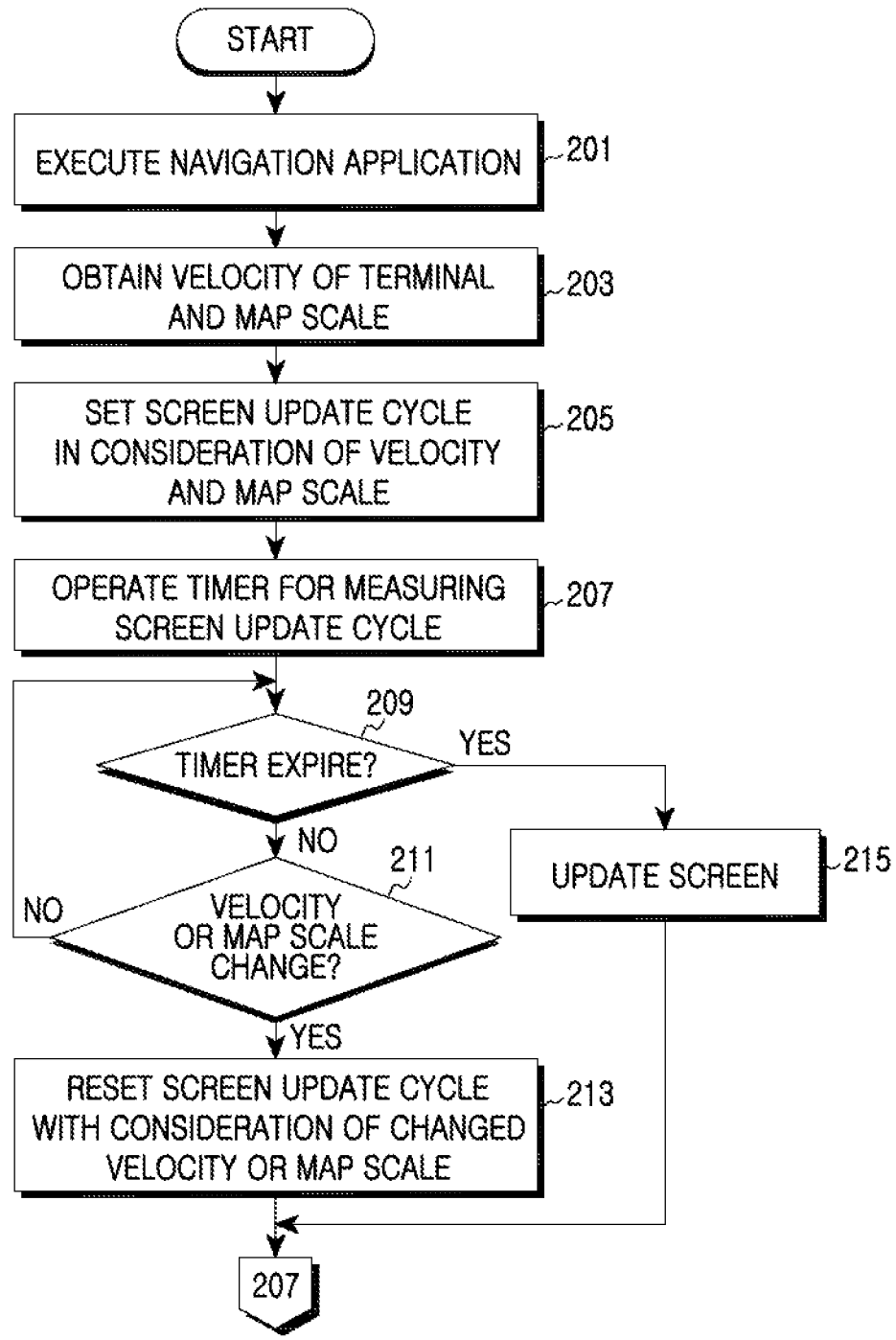
FIG. 2 is a flowchart illustrating a procedure for setting a screen update cycle in a mobile terminal according to an exemplary embodiment of the present invention.

FIG. 2 is a flowchart illustrating a procedure for setting a screen update cycle in a mobile terminal according to an exemplary embodiment of the present invention.

Referring to FIG. 2, when a navigation application is executed in step 201, the mobile terminal obtains a velocity of the mobile terminal and a map scale in step 203. At this point, the velocity of the mobile terminal may be obtained using a GPS receiver, and the amp scale may be obtained as a value preset in the mobile terminal or set by a user.

The mobile terminal sets a screen update cycle in consideration of the velocity and the map scale in step 205. Here, the mobile terminal sets the screen update cycle such that a navigation execution screen is updated at a fast rate when the velocity of the mobile terminal is fast, and sets the screen update cycle such that the navigation execution screen is updated at fast rate when the map scale is large. This is because when the velocity of the mobile terminal is slow, a rate of position change of the mobile terminal is small and a corresponding position displayed on the screen changes little if any, so that the screen does not need to be updated frequently. In contrast, when the velocity of the mobile terminal is fast, the rate of position change of the mobile terminal is large and the corresponding position displayed on the screen needs to be changed quickly, so that the screen needs to be updated frequently. In addition, when the mobile terminal moves a preset distance, since the change in position of the mobile terminal displayed on the screen in the case where the map scale is large is large compared with the case where the map scale is small, the screen needs to be updated frequently. Here, the mobile terminal may calculate and set the screen update cycle using Equation (1) or (2).

The mobile terminal sets and operates a timer for measuring the set screen update cycle in step 207. The mobile terminal determines whether the timer, which measures an amount of time corresponding to the set screen update cycle, expires in step 209.

When the timer does not expire, the mobile terminal determines whether the velocity or the map scale changes in step 211. Here, the map scale value may be changed by the user's setting. For example, the map scale may be changed by a zoom in/out function. When the velocity or the map scale does not change, the mobile terminal returns to step 209 to determine whether the timer expires.

In contrast, when the velocity or the map scale changes, the mobile terminal resets the screen update cycle in consideration of the changed velocity or map scale in step 213, and returns to step 209. Here, the mobile terminal may calculate and reset the screen update cycle using Equation (1) or (2). At this point, the mobile terminal compares the reset screen update cycle with a remaining amount of time of the timer. Depending on the comparison result, the mobile terminal may wait until the timer in operation expires to update the screen and operate the timer by the reset screen update cycle to update the screen. Alternatively, the mobile terminal may end the tuner in operation and re-operate the timer by the reset screen update cycle to update the screen. For example, when the reset screen update cycle is longer than the remaining time of the timer, the mobile terminal may wait until the timer expires and the screen is updated and then operate the timer by the reset screen update cycle to update the screen. In contrast, when the reset screen update cycle is shorter than the remaining time of the timer, the mobile terminal may end the timer and operate the timer by the reset screen update cycle to update the screen.

When the tinier expires as a result of the determination in step 209, the mobile terminal updates the display screen in step 215 and returns to step 207 to perform subsequent steps.

Figure 3:
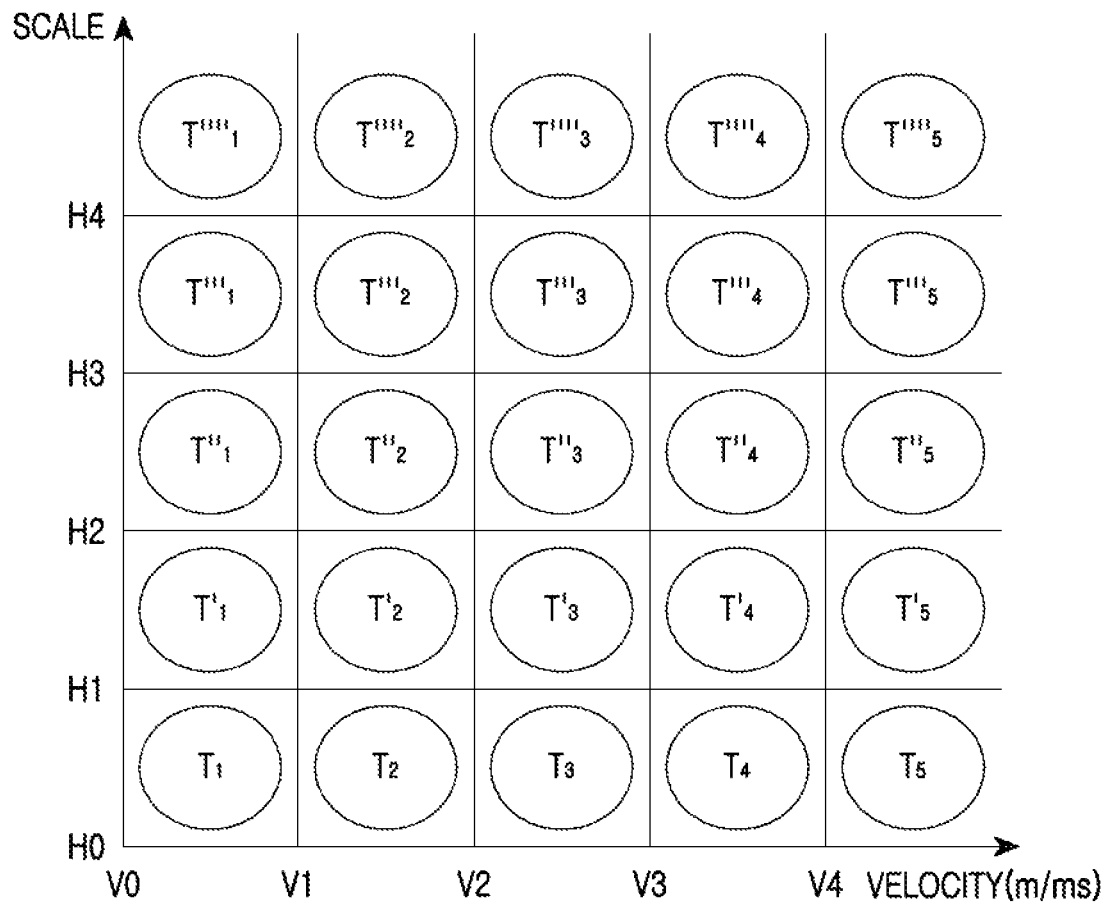
FIG. 3 is a view illustrating a screen update cycle set depending on a velocity of a mobile terminal and a map scale used by the mobile terminal according to an exemplary embodiment of the present invention.

FIG. 3 is a view illustrating a screen update cycle set depending on a velocity of a mobile terminal and a map scale used by the mobile terminal according to an exemplary embodiment of the present invention. Here, a horizontal axis is a velocity of the mobile terminal, and a vertical axis is a map scale used by the mobile terminal.

Referring to FIG. 3, the mobile terminal sets a long screen update cycle such that a navigation execution screen is updated at a slow rate when a velocity of the mobile terminal is slow and a map scale used by the mobile terminal is small, and sets a short screen update cycle such that the navigation execution screen is updated at a fast rate when the velocity of the mobile terminal is fast and the map scale is large. Here, $T_n$ which represents the cycle has a relation of $T_1 > T_2 > T_3 > T_4 > T_5$, and a relation of $T_n > T'_n > T''_n > T'''_n > T''''_n$.

Though the screen update cycle has been reset when the velocity has changed in the above description, the screen update cycle may be reset in the case where potential velocities of the mobile terminal are divided into ranges of velocities and the velocity of the mobile terminal deviates from a given range, or may be reset in the case where the velocity changes by more than a threshold. For example, in the case where the velocity is divided into ranges, such as 0-10, 11-20, . . . , 111-120 km/s and the velocity of the mobile terminal changes from 11 km/s to 18 km/s, the mobile terminal does not reset the screen update cycle because the velocity has not deviated from the velocity range it was in. However, when the velocity of the mobile terminal changes from 11 km/s to 5 km/s, the mobile terminal may reset the screen update cycle because the velocity has deviated from the velocity range it was in. For another example, when a velocity change threshold of the velocity is 5 km/s and the velocity changes from 11 km/s to 18 km/s, the mobile terminal resets the screen update cycle because the velocity has changed by more than 5 km/s, which is the velocity change threshold. When the velocity changes from 11 km/s to 7 km/s, the mobile terminal does not reset the screen update cycle because the velocity has changed by less than 5 km/s, which is the velocity change threshold.

In addition, though the screen update cycle has been changed when the velocity or the map scale changes in the above description, the velocity or the map scale may be determined after every preset amount of time to update the screen update cycle.

In addition, though exemplary embodiments of the present invention change the screen update cycle in consideration of both the velocity and the map scale, the screen update cycle may be changed in consideration of only one of the velocity and the map scale.

According to exemplary embodiments of the present invention, a mobile terminal sets a navigation screen update cycle in consideration of its velocity and a map scale to reduce an amount of power consumed during execution of a navigation application, so that a driving time of the navigation application and a driving time of the mobile terminal may be extended.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for setting a navigation screen update cycle in a mobile terminal, the method comprising:
    obtaining a velocity of the mobile terminal from a GPS receiver and a map scale predetermined in the mobile terminal;
    setting a screen update cycle using the obtained velocity and the map scale; and
    updating a navigation screen display according to the set screen update cycle,
    wherein the screen update cycle is changed during operation of the mobile terminal, and
    wherein the screen update cycle is set based on:

$$T_k(ms) = \frac{1}{V_n} \times XA_P$$

$$A_P = DS \times \left(\frac{1}{S}\right)^2 \times P_C$$

where $T_k$(ms) is the screen u s date cycle $V_n$ is the velocit of the mobile terminal, $XA_p$ is an area of X pixels, $A_p$ is an area of one pixel, DS is a screen size of the mobile terminal S is a ma scale and $P_c$ is a number of all sixels.

2. The method of claim 1, wherein the screen update cycle is set short when the velocity is fast, and set long when the velocity is slow.

3. The method of claim 1, wherein the screen update cycle is set short when the map scale is large, and set long when the map scale is small.

4. A method for setting a navigation screen update cycle in a mobile terminal, the method comprising:
    obtaining a velocity of the mobile terminal from a GPS receiver and a map scale predetermined in the mobile terminal;
    setting a screen update cycle using the obtained velocity and the map scale; and
    updating a navigation screen display according to the set screen update cycle,
    wherein the screen update cycle is changed during operation of the mobile terminal, and
    wherein the screen update cycle is set based on:

$$T_k(ms) = \frac{1}{V_n} \times XW_P(\text{or } XH_P)$$

$$W_P(\text{or } H_P) = W_{DS}(\text{or } H_{DS}) \times \frac{1}{S} \times P_C$$

where $T_k$(ms) is the screen update cycle, $V_n$ is the velocity of the mobile terminal, $XW_p$ is a width of X pixels, $XH_p$ is a height of X pixels, $W_p$ is a width of one pixel, $H_p$ is a height of one pixel, $W_{DS}$ is a screen width of the mobile terminal, $H_{DS}$ is a screen height of the mobile terminal, S is a map scale, and $P_c$ is a number of all pixels.

5. The method of claim 1, further comprising resetting the screen update cycle when at least one of the velocity and the map scale changes.

6. The method of claim 5, wherein the resetting of the screen update cycle comprises:
when the velocity changes, determining whether a velocity before the change and a velocity after the change belong to a same range of velocities when potential velocities of the mobile terminal are divided into a plurality of ranges; and
when the velocity before the change and the velocity after the change do not belong to the same range of velocities, resetting the screen update cycle.

7. The method of claim 6, further comprising, when the velocity before the change and the velocity after the change belong to the same range of velocities, maintaining the screen update cycle.

8. The method of claim 5, wherein the resetting of the screen update cycle comprises:
when the velocity changes, comparing a difference between a velocity before the change and a velocity after the change with a preset threshold; and
when the difference between the velocity before the change and the velocity after the change is greater than the threshold, resetting the screen update cycle.

9. The method of claim 8, further comprising, when the difference between the velocity before the change and the velocity after the change is equal to or less than the threshold, maintaining the screen update cycle.

10. An apparatus for setting a navigation screen update cycle in a mobile terminal, the apparatus comprising:
a controller for obtaining a velocity of the mobile terminal from a GPS receiver and a map scale predetermined in the mobile terminal, and for setting a screen update cycle using the obtained velocity and the map scale; and
a display unit for updating a navigation screen display according to the set screen update cycle,
wherein the screen update cycle is changed during operation of the mobile terminal, and
wherein the controller sets the screen update cycle based on:

$$T_k(ms) = \frac{1}{V_n} \times XA_P$$

$$A_P = DS \times \left(\frac{1}{S}\right)^2 \times P_C$$

where $T_k(ms)$ is the screen update cycle $V_n$ is the velocit of the mobile terminal, $XA_p$ is an area of X pixels, $A_p$ is an area of one pixel, DS is a screen size of the mobile terminal, S is a map scale, and $P_c$ is a number of all pixels.

11. The apparatus of claim 10, wherein the controller sets the screen update cycle short when the velocity is fast, and sets the screen update cycle long when the velocity is slow.

12. The apparatus of claim 10, wherein the controller sets the screen update cycle short when the map scale is large, and sets the screen update cycle long when the map scale is small.

13. The apparatus of claim 10, wherein the controller resets the screen update cycle when at least one of the velocity and the map scale changes.

14. The apparatus of claim 13, wherein when the velocity changes, the controller determines whether a velocity before the change and a velocity after the change belong to a same range of velocities when potential velocities of the mobile terminal are divided into a plurality of ranges, and
when the velocity before the change and the velocity after the change do not belong to the same range of velocities, the controller resets the screen update cycle.

15. The apparatus of claim 14, wherein when the velocity before the change and the velocity after the change belong to the same range of velocities, the controller maintains the screen update cycle.

16. The apparatus of claim 13, wherein when the velocity changes, the controller compares a difference between a velocity before the change and a velocity after the change with a preset threshold, and
when the difference between the velocity before the change and the velocity after the change is greater than the threshold, the controller resets the screen update cycle.

17. The apparatus of claim 16, wherein when the difference between the velocity before the change and the velocity after the change is equal to or less than the threshold, the controller maintains the screen update cycle.

18. An apparatus for setting a navigation screen update cycle in a mobile terminal, the apparatus comprising:
a controller for obtaining a velocity of the mobile terminal from a GPS receiver and a map scale predetermined in the mobile terminal, and for setting a screen update cycle using the obtained velocity and the map scale; and
a display unit for updating a navigation screen display according to the set screen update cycle,
wherein the screen update cycle is changed during operation of the mobile terminal, and
wherein the controller sets the screen update cycle based on:

$$T_k(ms) = \frac{1}{V_n} \times XW_P(\text{or } XH_P)$$

$$W_P(\text{or } H_P) = W_{DS}(\text{or } H_{DS}) \times \frac{1}{S} \times P_C$$

where $T_k(ms)$ is the screen update cycle, $V_n$ is the velocity of the mobile terminal, $XW_p$ is a width for X pixels, XHp is a height for X pixels, Wp is a width of one pixel, $H_p$ is a height of one pixel, $W_{DS}$ is a screen width of the mobile terminal, $H_{DS}$ is a screen height of the mobile terminal, S is a map scale, and $P_c$ is a number of all pixels.

* * * * *